(12) United States Patent
Kondo et al.

(10) Patent No.: US 8,488,035 B2
(45) Date of Patent: Jul. 16, 2013

(54) CAMERA SYSTEM FOR SUPPRESSING SPURIOUS SIGNAL

(75) Inventors: Toru Kondo, Hino (JP); Seisuke Matsuda, Hachioji (JP)

(73) Assignee: Olympus Corporation, Tokyo (JP)

( * ) Notice: Subject to any disclaimer, the term of this patent is extended or adjusted under 35 U.S.C. 154(b) by 808 days.

(21) Appl. No.: 11/779,614

(22) Filed: Jul. 18, 2007

(65) Prior Publication Data
US 2008/0018761 A1 Jan. 24, 2008

(30) Foreign Application Priority Data

Jul. 19, 2006 (JP) .................................. 2006-196644

(51) Int. Cl.
H04N 3/14 (2006.01)
H04N 5/335 (2011.01)

(52) U.S. Cl.
USPC ............................ 348/308; 348/266; 348/302

(58) Field of Classification Search
USPC ......................................................... 348/308
See application file for complete search history.

(56) References Cited

U.S. PATENT DOCUMENTS

| 6,282,033 | B1 * | 8/2001 | Ning | 359/739 |
|---|---|---|---|---|
| 7,071,453 | B1 | 7/2006 | Pine | |
| 7,391,453 | B2 | 6/2008 | Ohkawa | |
| 7,511,752 | B2 | 3/2009 | Kurane | |
| 7,719,583 | B1 | 5/2010 | Lee et al. | |
| 2002/0012176 | A1 * | 1/2002 | Ning | 359/728 |
| 2004/0080659 | A1 * | 4/2004 | Iwane et al. | 348/342 |
| 2005/0225653 | A1 | 10/2005 | Masuyama et al. | |
| 2008/0018761 | A1 * | 1/2008 | Kondo et al. | 348/306 |

FOREIGN PATENT DOCUMENTS

| JP | 03-284073 A | 12/1991 |
|---|---|---|
| JP | 09-065213 A | 3/1997 |
| JP | 2002-320141 A | 10/2002 |
| JP | 2006-108889 A | 4/2006 |
| JP | 2006108889 A | 4/2006 |

OTHER PUBLICATIONS

U.S. Office Action issued Jul. 15, 2010 in related U.S. Appl. No. 11/836,382.

* cited by examiner

*Primary Examiner* — Antoinette Spinks
(74) *Attorney, Agent, or Firm* — Westerman, Hattori, Daniels & Adrian, LLP

(57) ABSTRACT

A camera system at least including: a MOS imaging device at least having a pixel section having a plurality of pixels two-dimensionally arrayed in row and column directions, each having a photoelectric conversion section for generating electrical signal corresponding to a quantity of incident light, an accumulation section for accumulating signal generated at the photoelectric conversion section, a transfer switch means for controlling transfer of signal from the photoelectric conversion section to the accumulation section, a reset switch means for resetting signal of the photoelectric conversion section, an amplification section for outputting a voltage value corresponding to signal of the accumulation section, and a select switch for selecting output of the amplification section, wherein an exposure period is determined by simultaneously resetting signals of the photoelectric conversion section for all pixels and effecting signal transfer from the photoelectric conversion section to the accumulation section after a predetermined time, and readout of signal from the pixels is sequentially effected at later time; and an incident light quantity suppressing means for suppressing the quantity of light incident to the MOS imaging device during read operation of signal from each pixel of the MOS imaging device.

4 Claims, 21 Drawing Sheets

F I G. 13
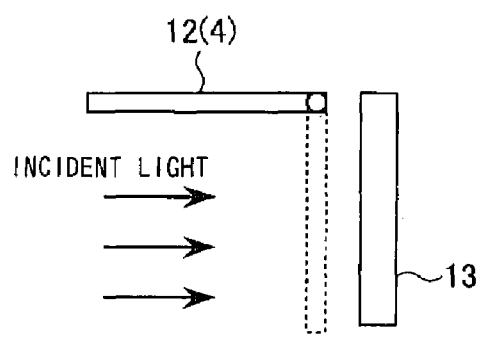

CAMERA SYSTEM FOR SUPPRESSING SPURIOUS SIGNAL

This application claims benefit of Japanese Patent Application No. 2006-196644 filed in Japan on Jul. 19, 2006, the contents of which are incorporated by this reference.

BACKGROUND OF THE INVENTION

The present invention relates to camera system having a concurrent shutter (also referred to as global shutter) function, which is capable of preventing an occurrence of spurious signal even when an image of high-luminance object is taken.

MOS solid-state imaging devices are conventionally known as those using pixels having amplification/read function as solid-state imaging device. FIG. 1 shows a pixel construction of MOS solid-state imaging device. Shown respectively in FIG. 1 are: 100, a single pixel; 101, a photodiode serving as photoelectric conversion device; 102, a transfer transistor for transferring signal charge generated at photodiode 101 to a charge accumulation section (FD) 103; 104, a reset transistor for resetting the photodiode 101 and charge accumulation section 103; 105, an amplification transistor for amplifying and reading voltage level of the charge accumulation section 103; and 106, a select transistor for selecting the pixel so as to transmit an output of the amplification transistor 105 to a vertical signal line 114. These but photodiode 101 are shielded from light.

Further, denoted by 110 is a pixel power supply for applying a power supply voltage VDD, which is electrically connected to drain of the amplification transistor 105 and to drain of the reset transistor 104. Denoted by 111 is a reset line to which row reset signal φRSi for resetting pixels corresponding to one row is inputted, which is connected to the gate of reset transistor 104 of the pixels corresponding to one row. Denoted by 112 is a transfer line to which row transfer signal φTXi for transferring the signal charge of the pixels corresponding to one row to the charge accumulation section 103 of the respective pixel is applied, which is electrically connected respectively to the gate of transfer transistor 102 of the pixels corresponding to one row. Denoted by 113 is a select line to which row select signal φSELi for selecting pixels corresponding to one row is applied, which is electrically connected respectively to the gate of select transistor 106 of the pixels corresponding to one row. With the pixel construction using four transistors in this manner, a photoelectric conversion function, reset function, amplification/read function and temporary memory function are achieved.

The pixels having such construction are arranged into m-rows by n-columns to form a pixel array, and a normal XY-addressing read method (also referred to as rolling shutter read method) using a vertical and horizontal scanning circuits (not shown) is employed to sequentially select and read the pixel signals row by row from the first row to m-th row so as to read all pixel signals.

In such normal XY-addressing read method, however, the point in time for transferring/accumulating signal to/at the charge accumulation section 103 is different from one row to another of the pixel array. More specifically, there is a difference in point in time corresponding to one frame at maximum between the first row to be read out-first and m-th row to be read out at the end. For this reason, a distorted image problem occurs when a rapidly moving object is photographed.

The global shutter read method is a method for solving the above problem in the normal XY-addressing read method as described. An operation of the global shutter read method will now be described with reference to the timing chart shown in FIG. 2. First, as row reset signals φRS1 to φRSm and row transfer signals φTX1 to φTXm of all rows are simultaneously outputted from the vertical scanning circuit (not shown), photodiodes 101 of the pixels corresponding to all rows are reset. After that, subsequent to a certain signal accumulation period (exposure period), row transfer signals φTX1 to φTXm of all rows are simultaneously outputted from the vertical scanning circuit. The signal charges accumulated within the exposure period at photodiode 101 of the pixels corresponding to all rows are thereby transferred simultaneously for all rows to the electric charge accumulation section 103. With such operation, a global shutter operation is effected.

A row-by-row read of signal charges accumulated at the electric charge accumulation section 103 is then started. First, as row select signal φSEL1 is outputted, pixels of the first row are selected and signal levels of the pixels are read out. Further, as row reset signal φRS1 is outputted, the electric charge accumulation sections 103 of the pixels of the first row are reset, and the reset levels of the pixels are read out. When the readout of signal level and reset level of the pixels of the first row are complete, pixels of the second row are selected, and the signal level and reset level thereof are read out. By performing this signal read scanning until m-th row, signals of one frame are read out.

Further, Japanese Patent Application Laid-Open 2006-108889 has proposed a solid-state imaging device where a pixel array formed of 2m-rows by n-columns of single pixels having the pixel construction as shown in FIG. 1 is used to cause an image signal output as in the following. In particular, as shown in FIG. 3, a signal-to-be pixel group 200-1, 200-2, … where the signals of photodiode are simultaneously reset for all pixels and, after completion of a predetermined exposure period, the signals generated at photodiode are transferred to the charge accumulation section, and correcting pixel group 300-1, 300-2, … where the signals generated at photodiode are not transferred to the charge accumulation section are provided alternately on every other row in the pixel array so that difference between the respective signal outputs of the signal-to-be pixel group 200-1, 200-2, …, and of the correcting pixel group 300-1, 300-2, … is obtained and outputted as image signal.

FIG. 4 shows a timing chart for explaining operation of the solid-state imaging device having such construction. In FIG. 4, "1M-th to mM-th rows" refers to the first to m-th rows of the signal-to-be pixel group 200-1, 200-2, …, and "1S-th to mS-th rows" refers to the first to m-th rows of the correcting pixel group 300-1, 300-2, …, etc.

According to thus constructed solid-state imaging apparatus, if signals are sequentially read out row by row after concurrently transferring the signal charges to the electric charge accumulation section, signal retaining time at the charge accumulation section of the pixels of the rows which are read out late becomes relatively longer. While shading due to leak current or leakage light thereby tends to occur, an occurrence of such shading can presumably be prevented by the above described method where a difference signal is obtained.

SUMMARY OF THE INVENTION

In a first aspect of the invention, there is provided a camera system at least including: a MOS imaging device at least having a pixel section having a plurality of pixels two-dimensionally arrayed in row and column directions, each having a photoelectric conversion section for generating electrical signal corresponding to a quantity of incident light, an accumulation section for accumulating signal generated at the photoelectric conversion section, a transfer switch means for controlling transfer of signal from the photoelectric conversion section to the accumulation section, a reset switch means for resetting signal of the photoelectric conversion section, an amplification section for outputting a voltage value corresponding to signal of the accumulation section, and a select switch for selecting output of the amplification section, wherein an exposure period is determined by simultaneously resetting signals of the photoelectric conversion section for all pixels and effecting signal transfer from the photoelectric conversion section to the accumulation section after a predetermined time, and readout of signal from the pixels is sequentially effected at later time; and an incident light quantity suppressing means for suppressing the quantity of light incident to the MOS imaging device during read operation of signal from each pixel of the MOS imaging device.

In a second aspect of the invention, there is provided a camera system at least including: a MOS imaging device at least having a pixel section having a plurality of pixels two-dimensionally arrayed in row and column directions, each having a photoelectric conversion section for generating electrical signal corresponding to the quantity of incident light, an accumulation section for accumulating signal generated at the photoelectric conversion section, a transfer switch means for controlling transfer of signal from the photoelectric conversion section to the accumulation section, a reset switch means for resetting signal of the photoelectric conversion section, an amplification section for outputting a voltage value corresponding to signal of the accumulation section, and a select switch for selecting output of the amplification section, the pixel section at least including a signal-to-be pixel group where signal generated at the photoelectric conversion section is transferred to the accumulation section after completion of an exposure period and a correcting pixel group where signal generated at the photoelectric conversion section is not transferred to the accumulation section, wherein the exposure period is determined by simultaneously resetting signals of the photoelectric conversion section for all pixels and effecting signal transfer from the photoelectric conversion section to the accumulation section of the signal-to-be pixels after a predetermined time, and a difference signal between the signal read out from the pixels of the signal-to-be pixel group and the signal read out from the pixels of the correcting pixel group is outputted as an imaging signal; and an incident light quantity suppressing means for suppressing the quantity of light incident to the MOS imaging device during read operation of signal from each pixel of the MOS imaging device.

In a third aspect of the invention, there is provided a camera system at least including: a MOS imaging device at least having a pixel section having a plurality of pixels two-dimensionally arrayed in row and column directions, each having a first and a second photoelectric conversion sections for generating electrical signal corresponding to the quantity of incident light, an accumulation section for accumulating signals generated at the first and second photoelectric conversion sections, a first and a second transfer switch means for controlling transfer of signal from the first and the second photoelectric conversion sections to the accumulation section, a reset switch means for resetting signals of the first and the second photoelectric conversion sections, an amplification section for outputting a voltage value corresponding to signal of the accumulation section, and a select switch for selecting output of the amplification section, wherein signals of the first photoelectric conversion section are reset simultaneously for all pixels, and signals of the second photoelectric conversion section are reset simultaneously for all pixels after a predetermined time, a time difference between the resetting of the first photoelectric conversion section and the resetting of the second photoelectric conversion section being determined as an exposure period, wherein read operation of signals of the first and the second photoelectric conversion sections of each pixel is sequentially effected at later time, and a difference signal between the signal of the first photoelectric conversion section and the signal of the second photoelectric conversion section is outputted as an imaging signal; and an incident light quantity suppressing means for suppressing the quantity of light incident to the MOS imaging device during read operation of signal from each pixel of the MOS imaging device.

In a fourth aspect of the invention, the incident light quantity suppressing means in the camera system according to any one aspect of the first to third aspects suppresses the quantity of light incident to the MOS imaging device by a mechanical structure.

In a fifth aspect of the invention, the incident light quantity suppressing means in the camera system according to the fourth aspect is at least one of a stop mechanism and quick return mirror.

In a sixth aspect of the invention, the incident light quantity suppressing means in the camera system according to any one aspect of the first to third aspects suppresses the quantity of light incident to the MOS imaging device by an electrical control of a member for changing transmittance of light.

In a seventh aspect of the invention, the incident light quantity suppressing means in the camera system according to any one aspect of the first to sixth aspects suppresses the quantity of light incident to the MOS imaging device in sequence starting from rows or columns of which signals are read out late in the MOS imaging device.

BRIEF DESCRIPTION OF THE DRAWINGS

FIG. 13 schematically shows a main portion of a third embodiment.

DESCRIPTION OF THE PREFERRED EMBODIMENTS

An embodiment of the camera system according to the present invention will be described below with reference to the drawings.

Figure 5:
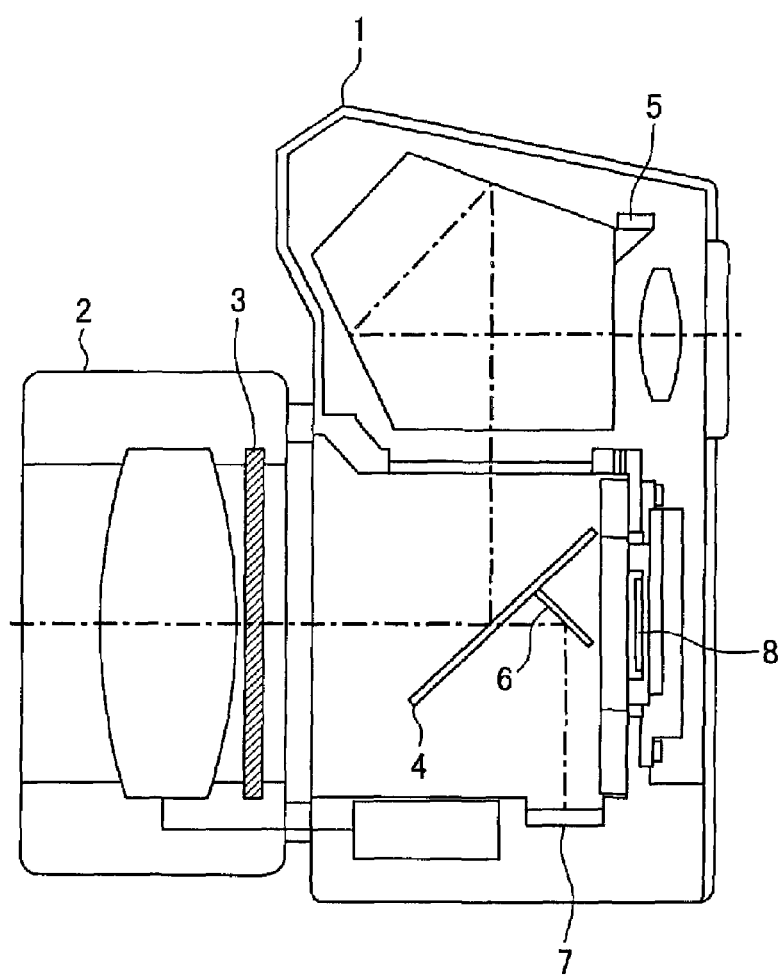
FIG. 5 shows an example of construction of camera system to which the invention is applied.

First, the fundamental construction of a general single lens reflex type electronic camera will be described by way of FIG. 5 as an example of construction of the camera system to which the invention is applied. FIG. 5 includes: a camera body 1; a taking optical system 2; a stop mechanism 3; a quick return mirror 4; a photometric section 5; a focus detecting mirror 6; a focus detecting section 7; and an imaging device 8.

Figure 6:
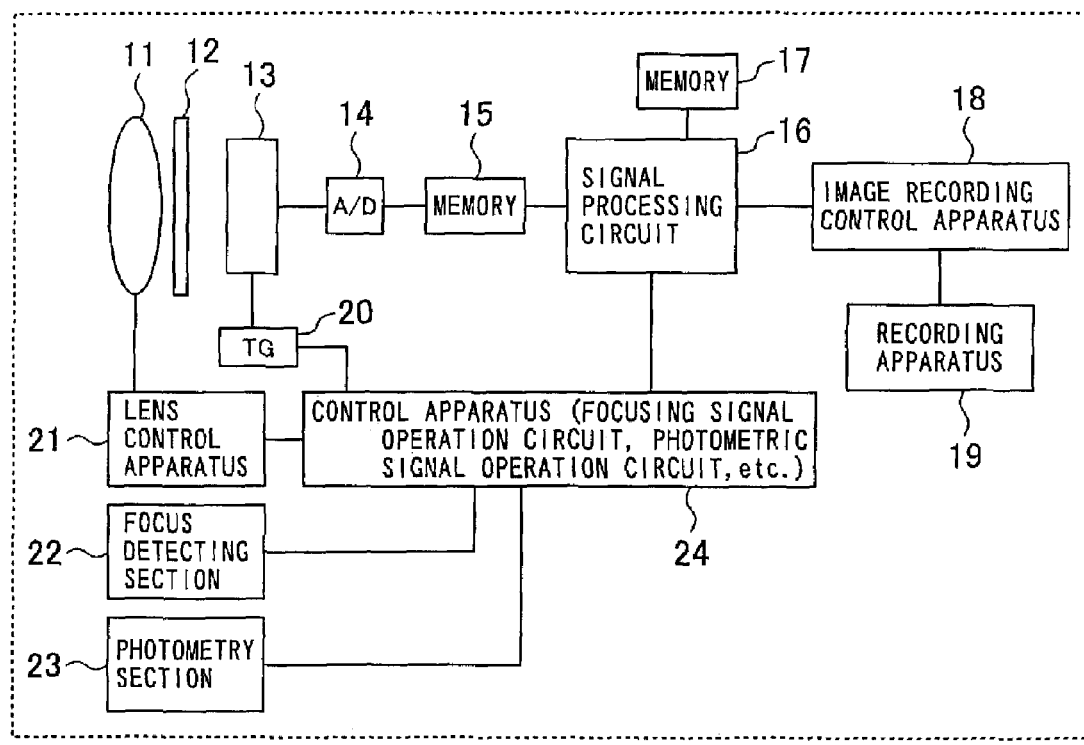
FIG. 6 is a schematic block diagram showing concept of the camera system according to the invention.

FIG. 6 is a block diagram showing an imaging device, and related apparatus as well as control system in the case where the invention is applied to an electronic camera which is the camera system shown in FIG. 5. FIG. 6 includes: a lens 11; an incident light quantity changing (suppressing) means 12; MOS imaging device 13; A/D converter 14; a memory 15; a signal processing circuit 16; a memory 17; an image recording control apparatus 18; a recording apparatus 19; TG circuit 20 where drive signal for driving MOS imaging device 13 is generated; a lens control apparatus 21; a focus detecting section 22; a photometric section 23; and a control apparatus 24 including a focus signal operation circuit, photometric signal operation circuit, etc. to control each section.

Figure 7A:
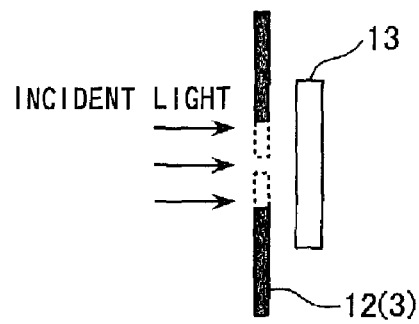
FIGS. 7A and 7B schematically show a main portion of a first embodiment of the camera system according to the invention, and a pixel construction of MOS imaging device thereof.
Figure 7B:
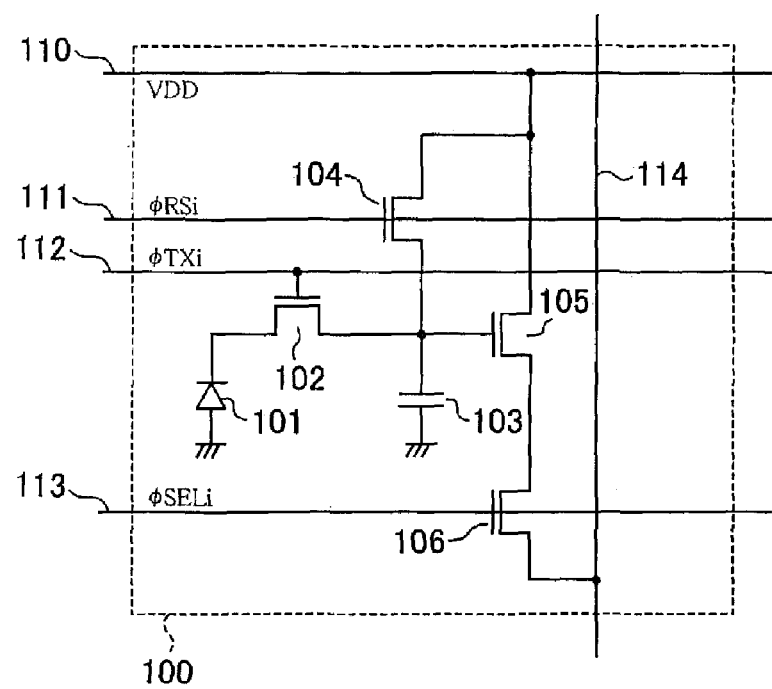

A first specific embodiment of the camera system shown in FIG. 6 will now be described. FIG. 7A is a schematic diagram showing a main portion of the first embodiment; and FIG. 7B shows a pixel construction of MOS imaging device of the first embodiment. In the first embodiment as shown in FIG. 7A, the stop mechanism 3 fundamentally included in the camera system is used as the incident light quantity changing means 12. The stop mechanism 3 is controlled to a stop value by an exposure control of normal image taking during an exposure period of MOS imaging device 13. At the time of sequentially reading signals after the exposure period, the stop value is increased i.e. aperture is limited so as to suppress the light incident to the MOS imaging device 13.

Figure 1:
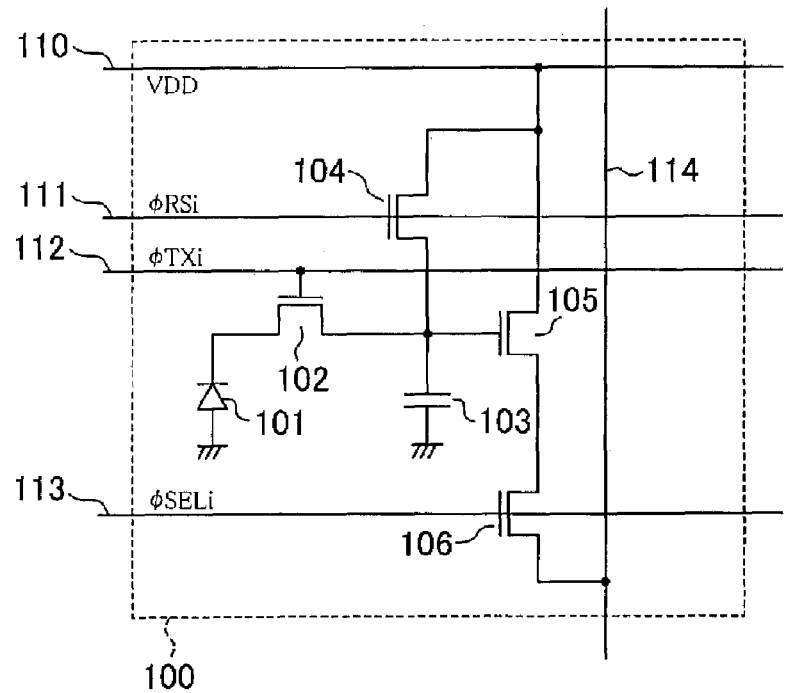
FIG. 1 shows the pixel construction of a prior-art MOS imaging device.
Figure 2:
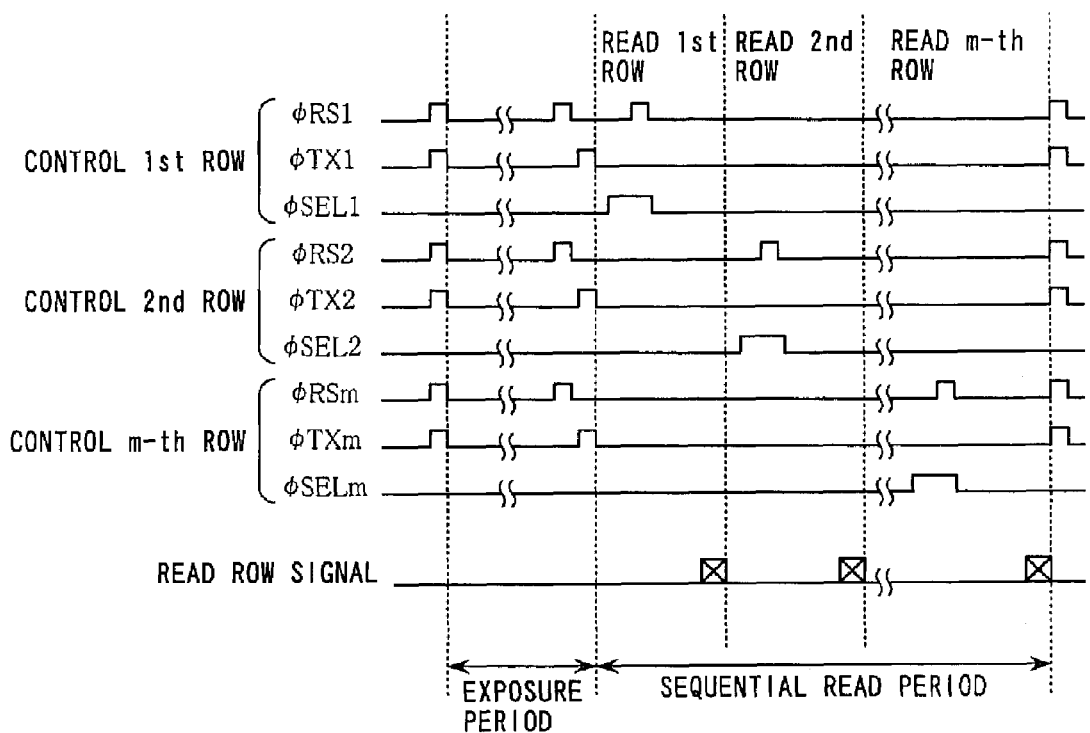
FIG. 2 is a timing chart for explaining operation of a global shutter read method of prior-art MOS imaging device.

The pixel construction of MOS imaging device 13 in the first embodiment is identical to the pixel construction of the MOS imaging device in the first prior-art example shown in FIG. 1, and a pixel array is similarly formed of an array of m-rows by n-columns. A detailed description thereof will be omitted.

Figure 8:
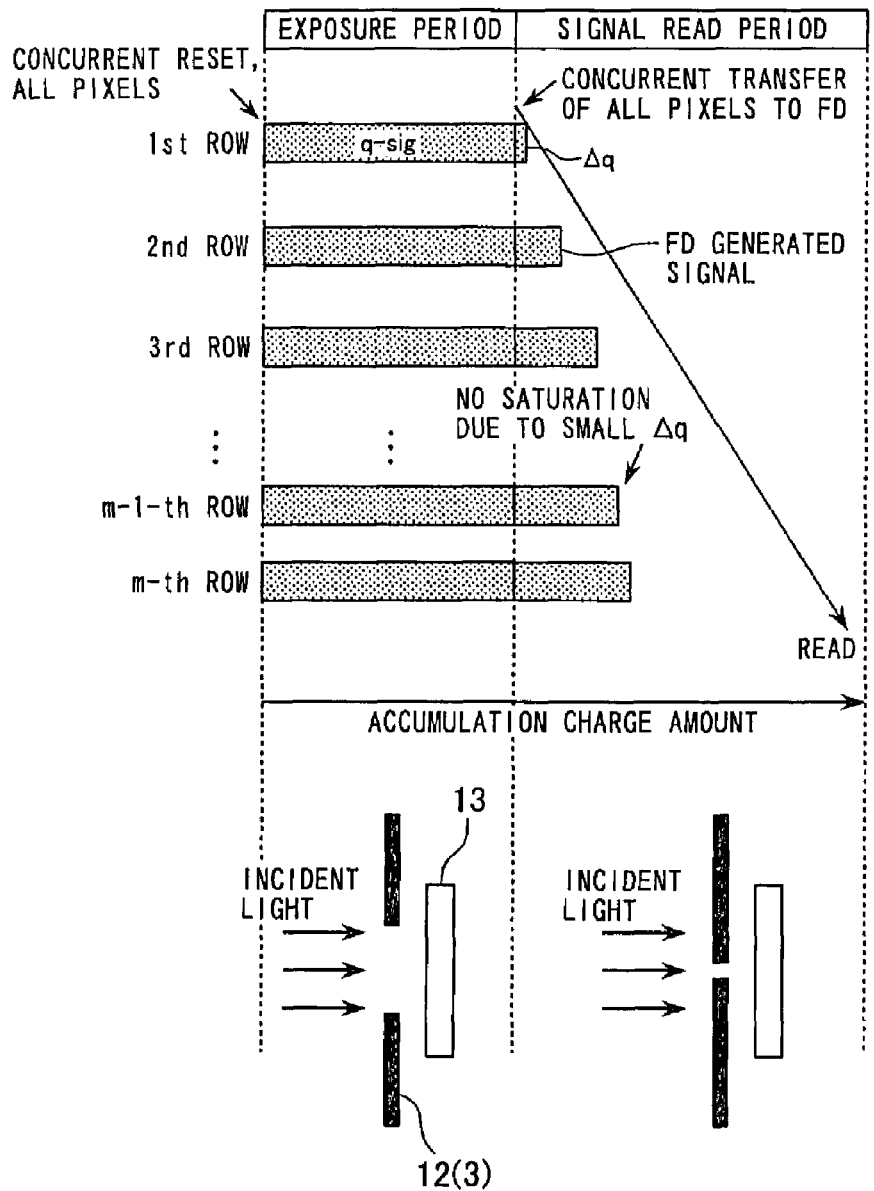
FIG. 8 shows accumulation charge amounts in an exposure period and signal read period of the pixels of each row of MOS imaging device, and operation modes of a stop mechanism serving as an incident light quantity changing means in the first embodiment.
Figure 9:
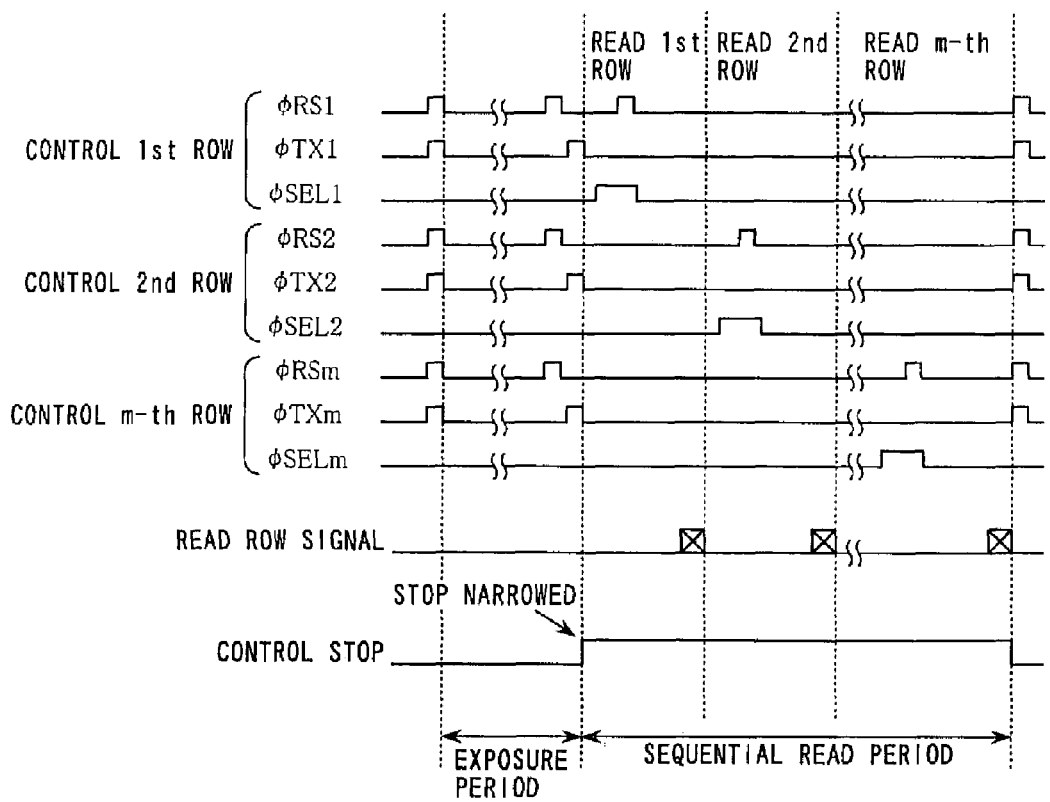
FIG. 9 is a timing chart for explaining operation of the pixel section of MOS imaging device and stop control operation in the first embodiment.

An operation in the first embodiment will now be described with reference to what is shown in FIG. 8 which indicates charge accumulation amounts in the exposure period and signal read period of the pixels of each row, and operation modes of the stop mechanism serving as the incident light quantity changing means, and also with reference to the timing chart shown in FIG. 9 for explaining operation of the pixel section and control operation of stop. First, row reset signals φRS1 to φRSm and row transfer signals φTX1 to φTXm of all rows are simultaneously outputted from a vertical scanning circuit (not shown). The photodiodes 101 of the pixels corresponding to all rows are thereby reset. Subsequently, after a certain signal accumulation period (exposure period) row transfer signals φTX1 to φTXm of all rows are simultaneously outputted from the vertical scanning circuit.

The signal charge accumulated within the exposure period at photodiode 101 of the pixels corresponding to all rows are thereby transferred simultaneously for all rows to the charge accumulation section 103. The global shutter operation is effected by such operation.

During the above described exposure period, stop value of the stop mechanism 3 is controlled based on normal exposure control. At a point in time when the row transfer signals φTX1 to φTXm of all rows are simultaneously outputted to transfer the signal charge of the pixels corresponding to all rows to the charge accumulation section 103 (point of completion of exposure period), the stop mechanism 3 is narrowed by control from the control apparatus whereby the incident light quantity is suppressed.

Next in the condition where the incident light quantity is being suppressed, a row-by-row readout of signal charge accumulated at the charge accumulation section 103 is started. First, as row select signal φSEL1 is outputted, pixels of the first row are selected so that signal level of the pixels is read out. Further, as row reset signal φRS1 is outputted, the charge accumulation section 103 of the pixels of the first row is reset so that reset level of the pixels is read out. When the readout of signal level and reset level of the pixels of the first row is complete, pixels of the second row are selected so that the signal level and reset level thereof are read out. By effecting this signal read scanning until m-th row, the signals of one frame are read out.

In the period where signals are sequentially read out after the exposure period, an excessive charge Δq occurs for example due to a oblique light incident to the charge accumulation section 103. The occurrence of such excessive charge Δq is greater for those signals of the pixels of the rows that are late in order of readout for which the retaining period of signal charge at the charge accumulation section 103 is longer. In the present embodiment, the stop mechanism is narrowed during this read period so as to suppress the incident light quantity. It is thereby possible to suppress the excessive charge Δq occurring at the charge accumulation section 103 so that saturation of the charge accumulation section 103 due to such excessive charge Δq can be prevented. Accordingly, it is possible to prevent deterioration of the readout signals.

Figure 3:
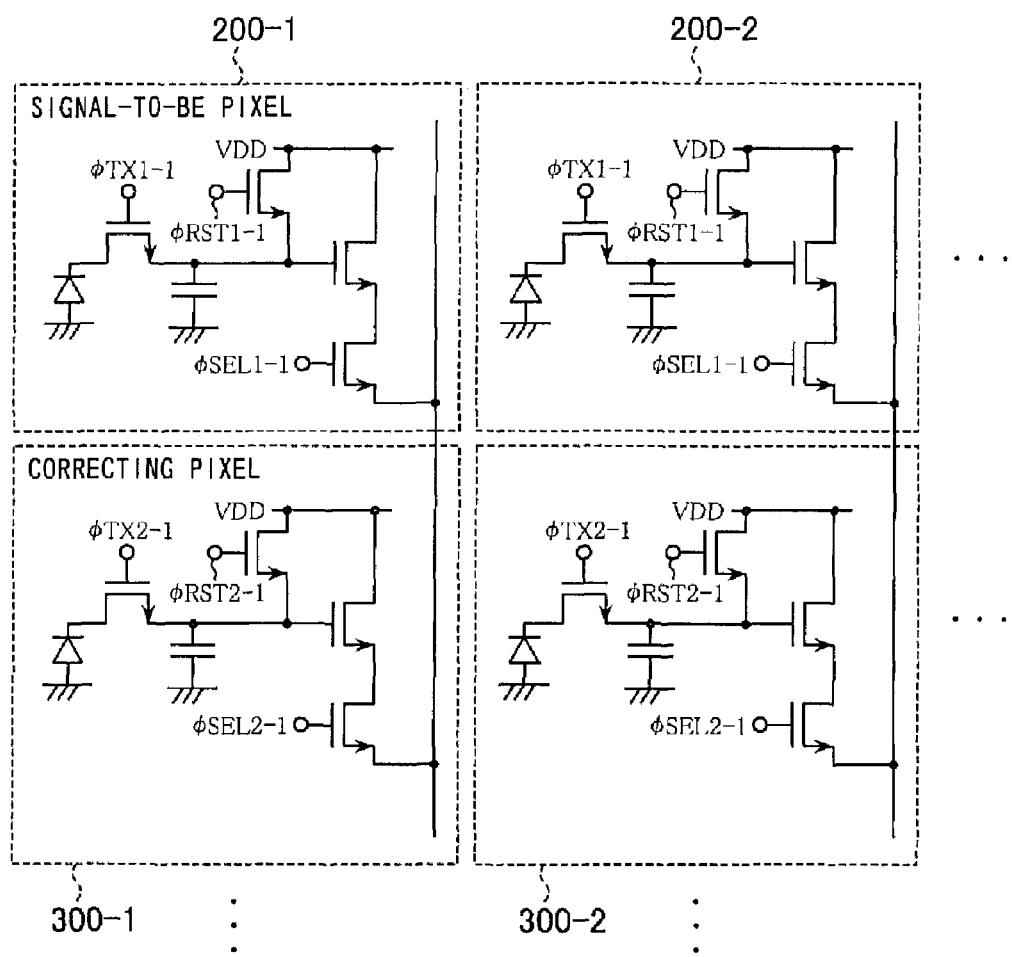
FIG. 3 shows construction of the pixel section of another prior-art MOS imaging device.
Figure 4:
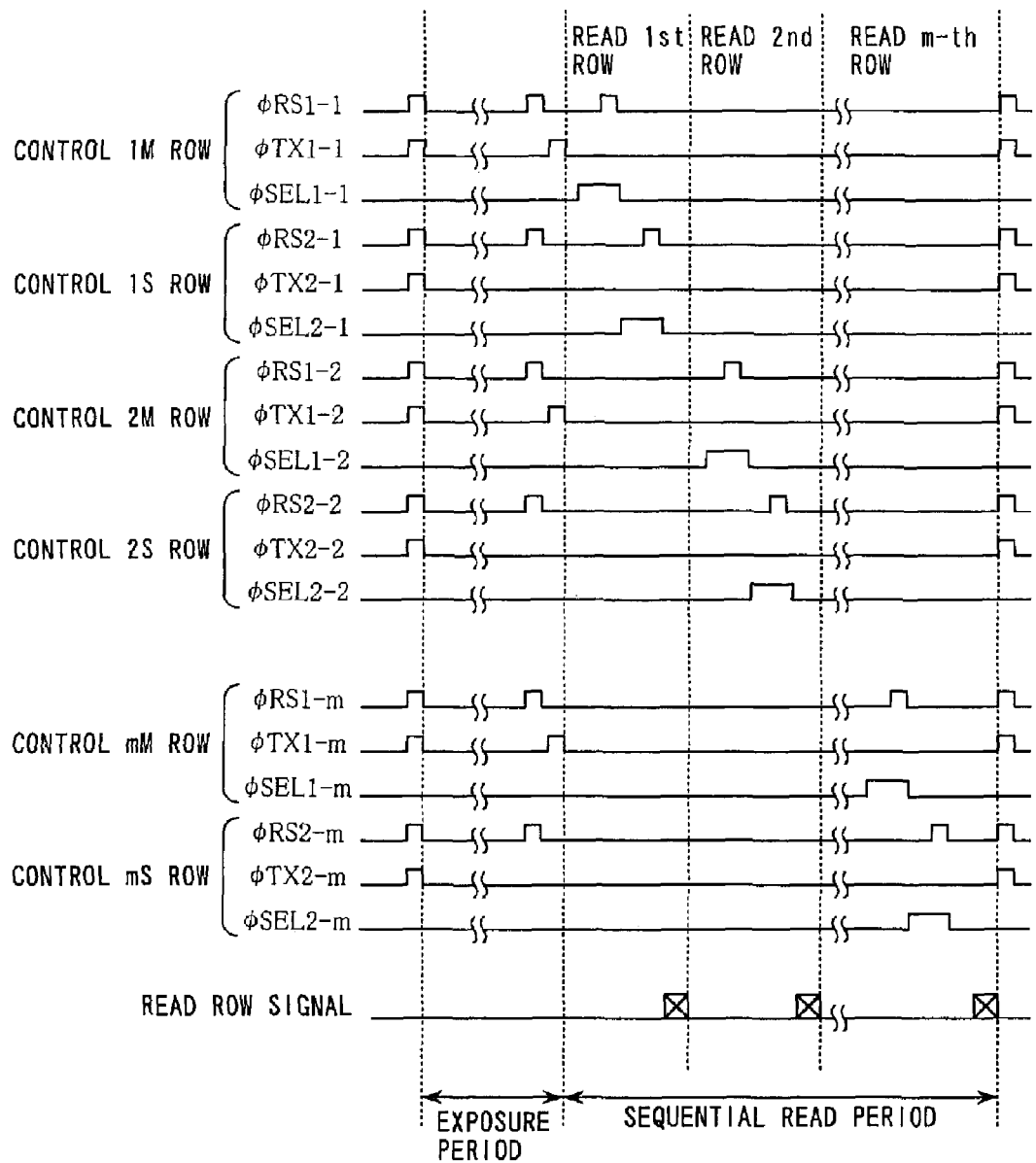
FIG. 4 is a timing chart for explaining signal read operation of pixel section of the prior-art example shown in FIG. 3.
Figure 10:
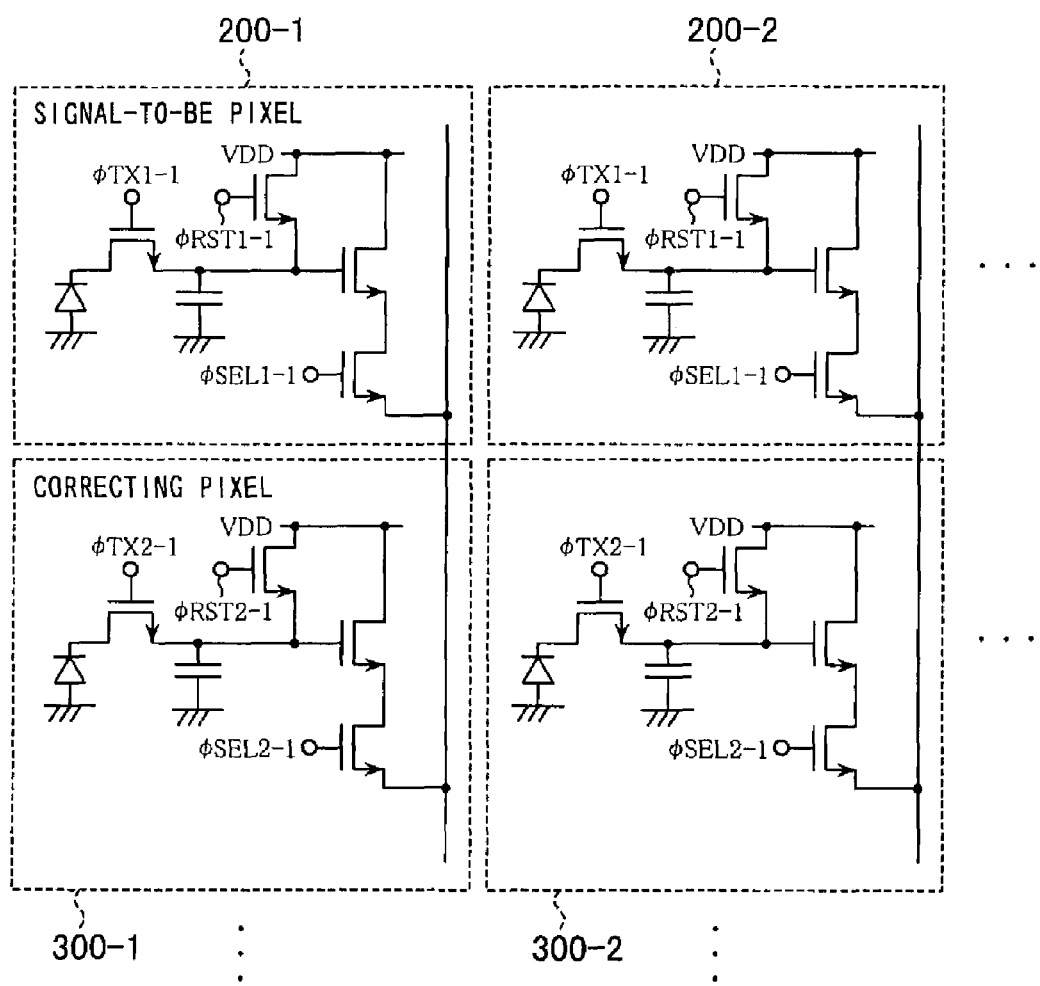
FIG. 10 shows construction of the pixel section of MOS imaging device in a second embodiment.

A second specific embodiment of the invention will now be described. In the second embodiment, although a stop mechanism is used as the incident light quantity changing means similarly to the first embodiment, the MOS imaging device used here has a pixel section of the construction different from the first embodiment. The pixel section of MOS imaging device in the second embodiment as shown in FIG. 10 has the same construction as the pixel section of MOS imaging device in the second prior-art example shown in FIG. 3. In particular, those pixel rows consisting of signal-to-be pixels 200-1, 200-2, . . . where the signals of photodiode are simultaneously reset for all pixels and, at the end of a predetermined exposure period, the signals generated at photodiode are transferred to the charge accumulation section, and those pixel rows consisting of correcting pixels 300-1, 300-2, . . . where the signals generated at photodiode are not transferred to the charge accumulation section are provided alternately on every other row.

Figure 11:
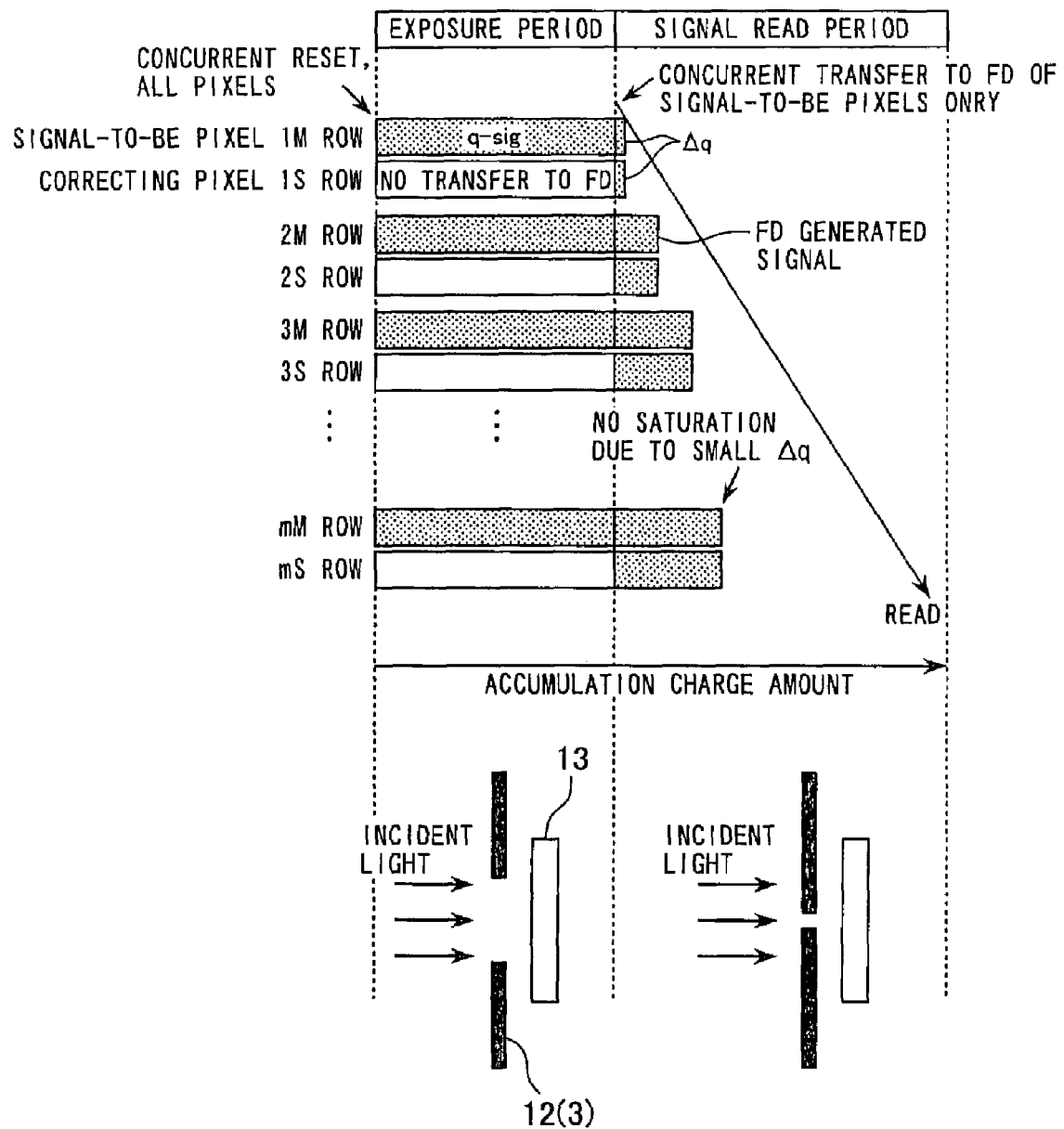
FIG. 11 shows accumulation charge amounts in an exposure period and signal read period of the pixels of each row of MOS imaging device, and operation modes of a stop mechanism serving as an incident light quantity changing means in the second embodiment.
Figure 12:
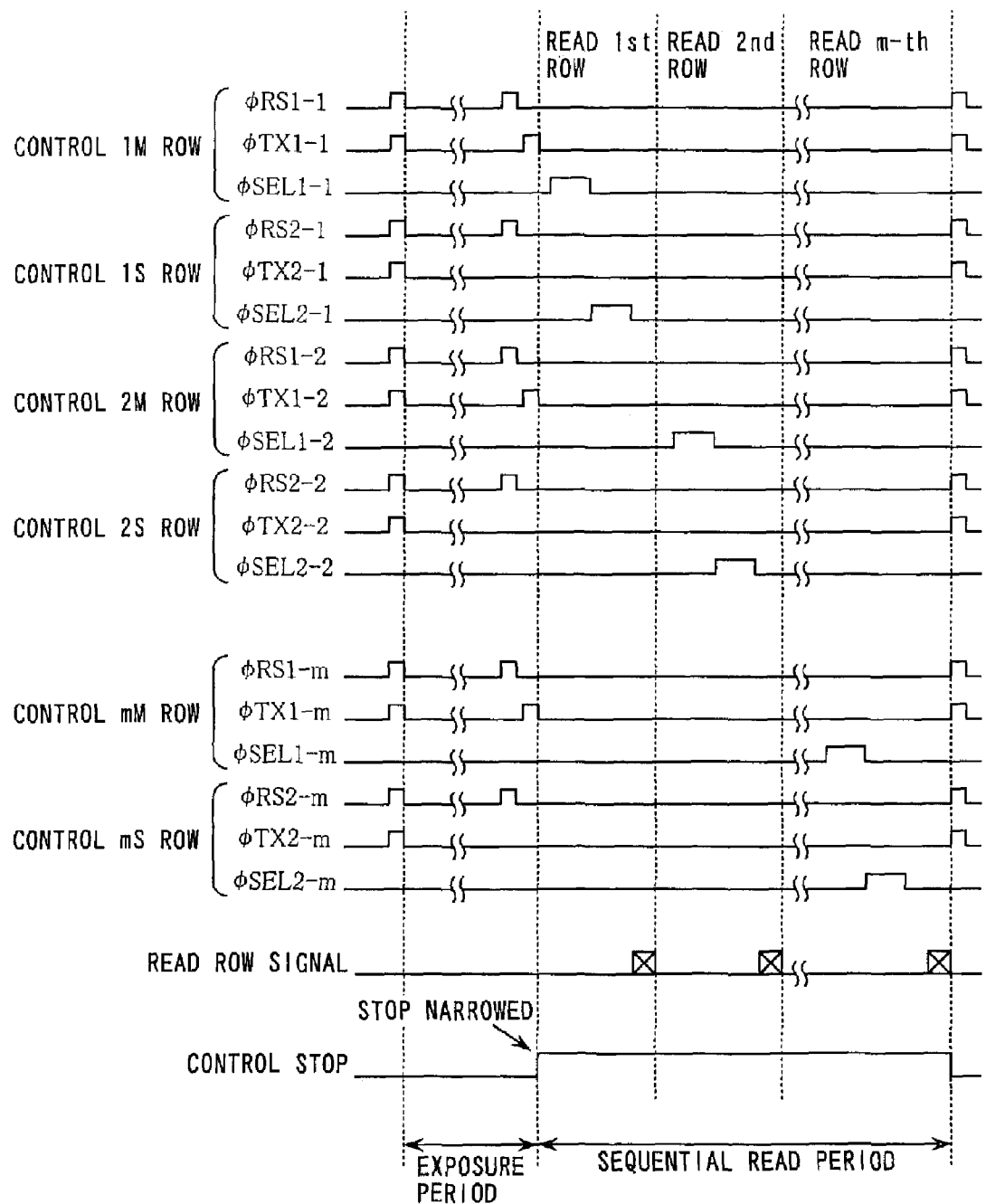
FIG. 12 is a timing chart for explaining operation of the pixel section of MOS imaging device and stop control operation in the second embodiment.

An operation in the second embodiment will now be described with reference to what is shown in FIG. 11 indicating charge accumulation amounts in the exposure period and signal read period of the pixels of each row, and operation modes of the stop mechanism 3 serving as the incident light quantity changing means 12, and to the timing chart shown in FIG. 12 for explaining operation of the pixel section and control operation of stop.

First, row reset signals φRS1-1 to φRS1-$m$ and φRS2-1 to φRS2-$m$ as well as row transfer signals φTX1-1 to φTX1-$m$ and φTX2-1 to φTX2-$m$ of all rows of the signal-to-be pixel rows and correcting pixel rows are simultaneously outputted from a vertical scanning circuit (not shown). The photodiodes 101 of the pixels corresponding to all rows are thereby reset. Subsequently, after a certain signal accumulation period (exposure period), row transfer signals φTX1-1 to φTX1-$m$ of all rows of the signal-to-be pixel rows are simultaneously outputted from the vertical scanning circuit. The signal charges accumulated within the exposure period at photodiode 101 of the pixels corresponding to all rows of the signal-to-be pixel rows are thereby transferred simultaneously for all rows to the charge accumulation section 103.

During the above described exposure period, stop value of the stop mechanism 3 is controlled based on normal exposure control. At a point in time when the row transfer signals φTX1-1 to φTX1-$m$ of all rows of the signal-to-be pixels are simultaneously outputted to transfer the signal charge of the pixels corresponding to all rows of the signal-to-be pixel rows to the charge accumulation section (point of completion of exposure period), the stop mechanism 3 is narrowed by control from the control apparatus whereby the incident light quantity is suppressed.

Next in the condition where the incident light quantity is being suppressed, a row-by-row read each of the electric charges accumulated at the respective charge accumulation sections of the signal-to-be pixel rows and the correcting pixel rows is started. First, row select signal φSEL1-1 of the signal-to-be pixel row is outputted. The pixels of the first row of the signal-to-be pixel rows are thereby selected so that pixel signals to which an excessive charge Δq for example due to a oblique light incident to the charge accumulation section is added are read out. Subsequently, row select signal φSEL2-1 of the first row of the correcting pixel rows is outputted. The pixels of the first correcting pixel row are thereby selected so that only the excessive charge Δq generated at the charge accumulation section is read out, since the pixel signal has not been transferred here in this case. The difference between the two is then obtained and outputted as row signal. After that, by similarly reading the signals until m-th row, the reading of signals of one frame is complete.

According to this read method, difference signal between the signal of the signal-to-be pixel and the signal of the correcting pixel is outputted as imaging signal. The signal where the excessive charge Δq generated at the charge accumulation section is canceled is thereby outputted so that deterioration of output signal is prevented. With the construction as it is, however, the excessive charge Δq to be added to the pixel signals of those rows which are read out late becomes greater, and there is a possibility of saturation of the signals of the signal-to-be pixels read out from the charge accumulation section. If difference is taken in such condition, a spurious signal occurs.

In the present embodiment, the stop mechanism 3 is used as the incident light quantity changing means 12 so that the stop mechanism 3 is narrowed in the period of sequential read so as to suppress the incident light quantity. The excessive charge Δq generated at the charge accumulation section thereby becomes smaller. Accordingly, since saturation of the signal of the signal-to-be pixels of the rows which are read out late does not occur, it is possible to eliminate the possibility of an occurrence of spurious signal when difference signal is obtained.

A third specific embodiment of the invention will now be described. In the third embodiment as shown in FIG. 13, a quick return mirror 14 provided in the single lens reflex camera is used instead of the stop mechanism 3 as the incident light quantity changing means 12, and the construction of pixel section thereof is similar to the second embodiment shown in FIG. 10.

Figure 14:
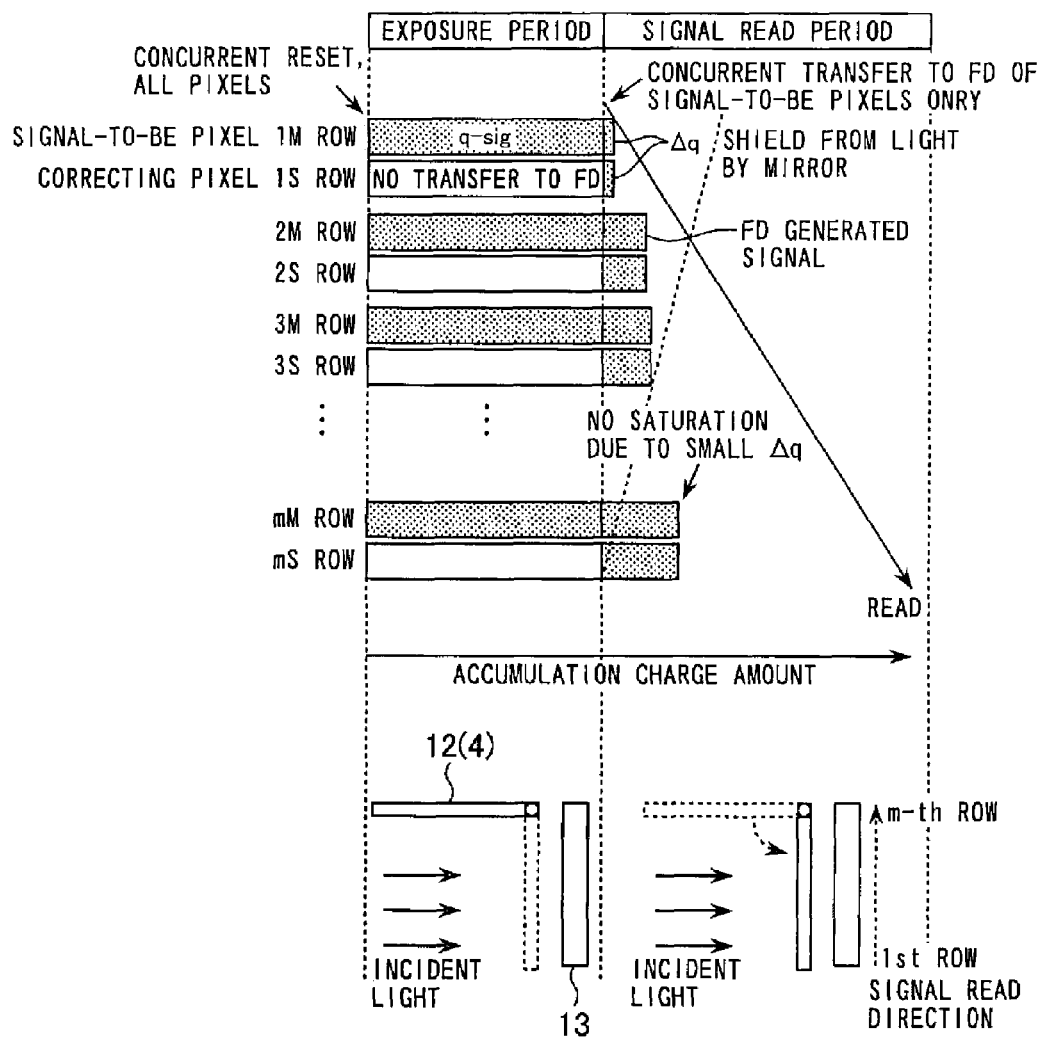
FIG. 14 shows accumulation charge amounts in an exposure period and signal read period of the pixels of each row of MOS imaging device, and operation modes of a quick return mirror serving as an incident light quantity changing means in the third embodiment.
Figure 15:
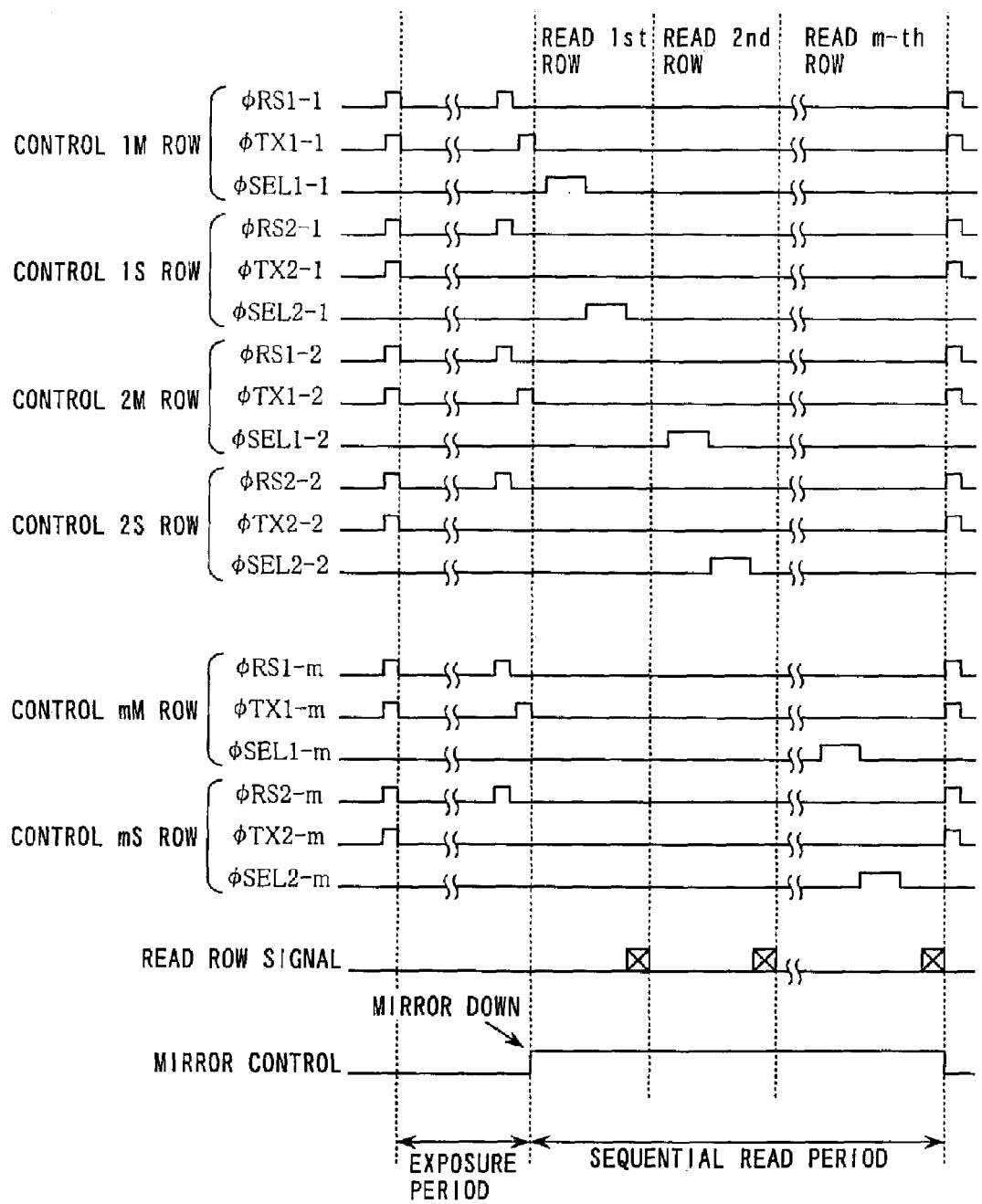
FIG. 15 is a timing chart for explaining operation of the pixel section of MOS imaging device and control operation of the quick return mirror in the third embodiment.

FIG. 14 shows accumulation charge amounts in the exposure period and period of signal read of the pixels of each row, and operation modes of the quick return mirror 4 serving as the incident light quantity changing means 12; and FIG. 15 is a timing chart for explaining operation of the pixel section and control operation of the quick return mirror 4. As can be seen form these figures, after concurrently resetting the signal-to-be pixel rows and correcting pixel rows, normal image taking is effected within the exposure period until the concurrent transfer of the signal of the signal-to-be pixel rows to the charge accumulation section. For this reason, the quick return mirror 4 is lifted up in the exposure period, and the quick return mirror 4 is brought down by control signal from the control apparatus at a point in time when the signals of the signal-to-be pixel rows are concurrently transferred to the charge accumulation section (point of completion of exposure period). The light incident the MOS imaging device 13 is thereby shut off.

Next, in the condition where the incident light is shut off, row-by-row read each of the charge accumulated at the respective charge accumulation sections of the signal-to-be pixel rows and the correcting pixel rows is started, and difference between the two is obtained and outputted as a row signal (imaging signal).

Also in this embodiment, since difference signal between the signal of the signal-to-be pixels and the signal of the correcting pixels is outputted as imaging signal, the imaging signal with less signal deterioration where the excessive charge Δq due to leakage light at the charge accumulation section is canceled is outputted. Further, in the period of sequential read, the quick return mirror 4 is brought down to shut off the light incident to MOS imaging device 13. The excessive charge Δq generated at the charge accumulation section thereby becomes smaller so that saturation of signal of the signal-to-be pixels of the rows of which the signals are read out late does not occur. Accordingly, there is no possibility of occurrence of spurious signal when difference is taken.

In the present embodiment, the quick return mirror 4 is used as the incident light quantity changing means 12. Of the quick return mirror 4, because of its mechanism, one end is supported on a shaft and the other end is turned from an upper position toward a lower position so as to shut off light in sequence starting from an upper region to lower region of the pixel section. In general, the manner of reading in sequence starting from the lower region is employed in MOS imaging device. Accordingly, when the quick return mirror 4 is used as the incident light quantity changing means 12, those rows to be read out last where the effect of occurrence of the excessive charge is greatest are the first to be shielded from light, whereby an occurrence of spurious signal for example due to leakage light can be effectively prevented.

It should be noted that the construction using a quick return mirror as the incident light quantity changing means as shown in the present embodiment may also be applied to the first embodiment shown in FIGS. 7A, 7B.

Figure 16:
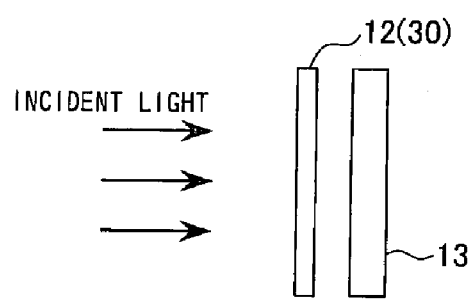
FIG. 16 schematically shows a main portion of a fourth embodiment.

A fourth specific embodiment of the invention will now be described. In the fourth embodiment, as shown in FIG. 16, a liquid crystal shutter 30 is used as the incident light quantity changing means 12 so as to use its transmission and non-transmission, while the construction of pixel section is similar to the second embodiment shown in FIG. 10.

Figure 17:
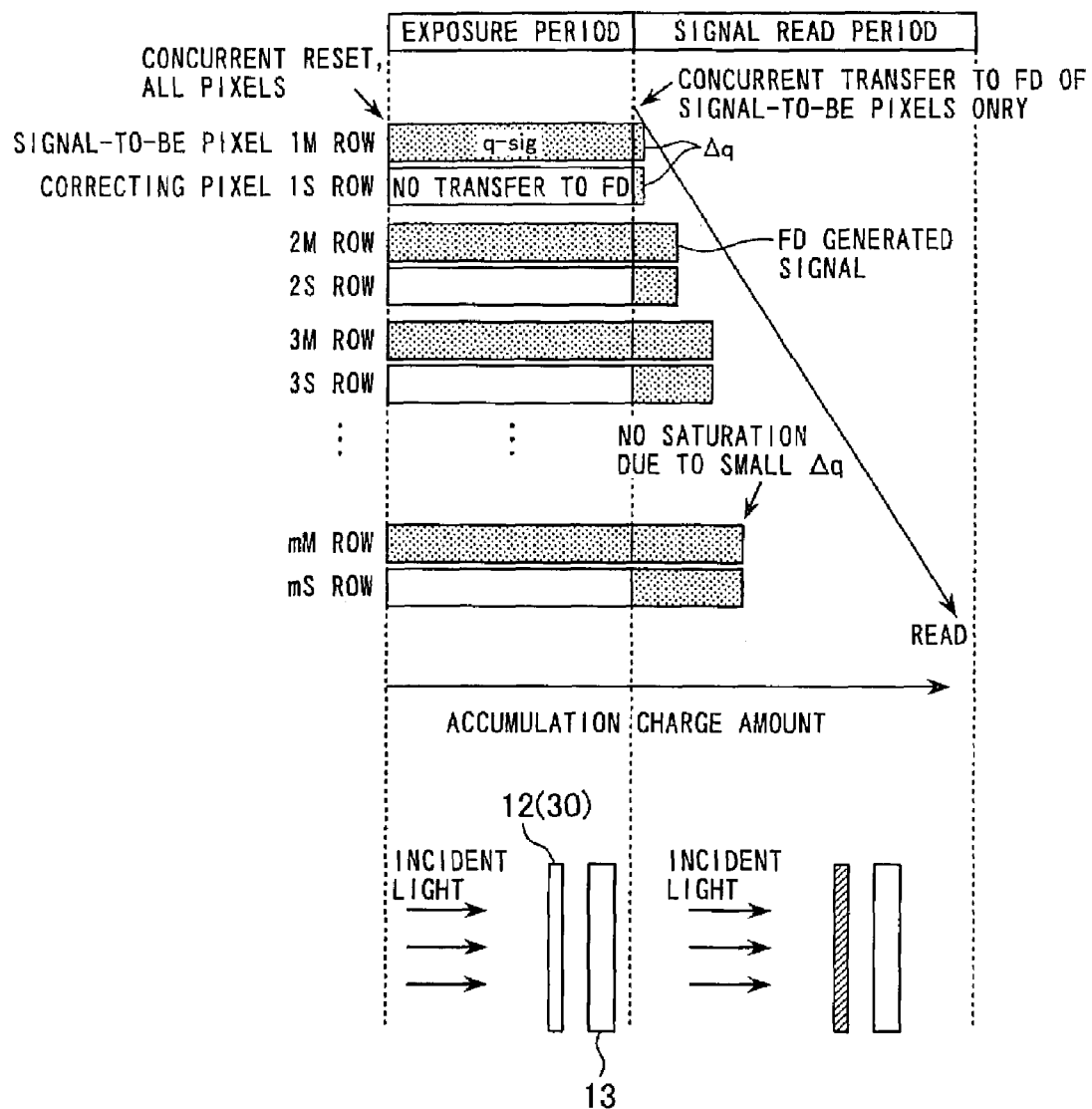
FIG. 17 shows accumulation charge amounts in an exposure period and signal read period of the pixels of each row of MOS imaging device, and operation modes of a liquid crystal shutter serving as an incident light quantity changing means in the fourth embodiment.
Figure 18:
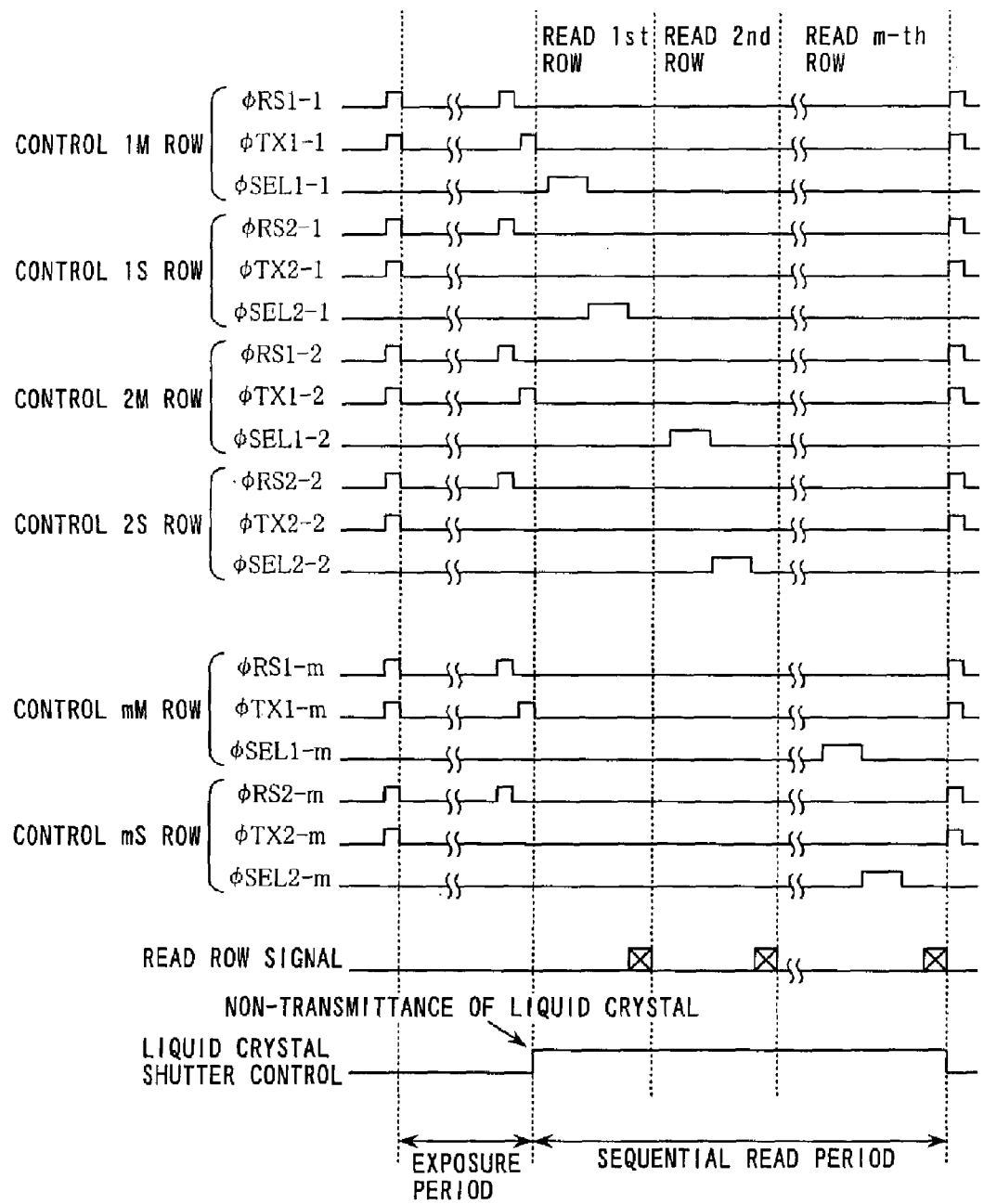
FIG. 18 is a timing chart for explaining operation of the pixel section of MOS imaging device and control operation of the liquid crystal shutter in the fourth embodiment.

FIG. 17 shows accumulation charge amounts in the exposure period and period of signal read of the pixels of each row, and operation modes of the liquid crystal shutter 30 serving as the incident light quantity changing means 12; and FIG. 18 is a timing chart for explaining operation of the pixel section and control operation of the liquid crystal shutter 30. As can be seen form these figures, after concurrently resetting the signal-to-be pixel rows and correcting pixel rows, normal image taking is effected within the exposure period until the concurrent transfer of the signal of the signal-to-be-pixel rows to the charge accumulation section. For this reason, the liquid crystal shutter 30 is kept in its transmitting condition during this exposure period, and the liquid crystal shutter 30 is brought into its non-transmitting condition by control signal from the control apparatus at a point in time when the signals of the signal-to-be pixel rows are concurrently transferred to the charge accumulation section (point of completion of exposure period). The light incident to the MOS imaging device 13 is thereby shut off.

Next, in the condition where the incident light is shut off, row-by-row read each of the electric charges accumulated at the respective charge accumulation sections of the signal-to-be pixel rows and the correcting pixel rows is started, and difference between the two is obtained and outputted as a row signal (imaging signal).

Also in this embodiment, difference signal between the signal of the signal-to-be pixels and the signal of the correcting pixels is outputted as imaging signal, the imaging signal with less signal deterioration where the excessive charge Δq due to leakage light at the charge accumulation section is canceled is outputted. Further, in the period of sequential read, the liquid crystal shutter 30 is brought into its non-transmitting condition to shut off the light incident to the MOS imaging device 13. The excessive charge Δq generated at the charge accumulation section thereby becomes smaller so that saturation of signal of the signal-to-be pixels of the rows of which the signals are read out late does not occur. Accordingly, there is no possibility of occurrence of spurious signal when difference is taken.

In the above fourth embodiment, one using the liquid crystal shutter 30 as the incident light quantity changing means 12 has been shown. Similar advantages may be obtained with using ND filter or simple light-shielding plate instead of the liquid crystal shutter 30 so as to allow its advancing/withdrawing into/from the optical path between the lens 11 and MOS imaging device 13.

It should be noted that the construction using a liquid crystal shutter as the incident light quantity changing means shown in the present embodiment may also be applied to the first embodiment shown in FIGS. 7A, 7B.

Figure 19:
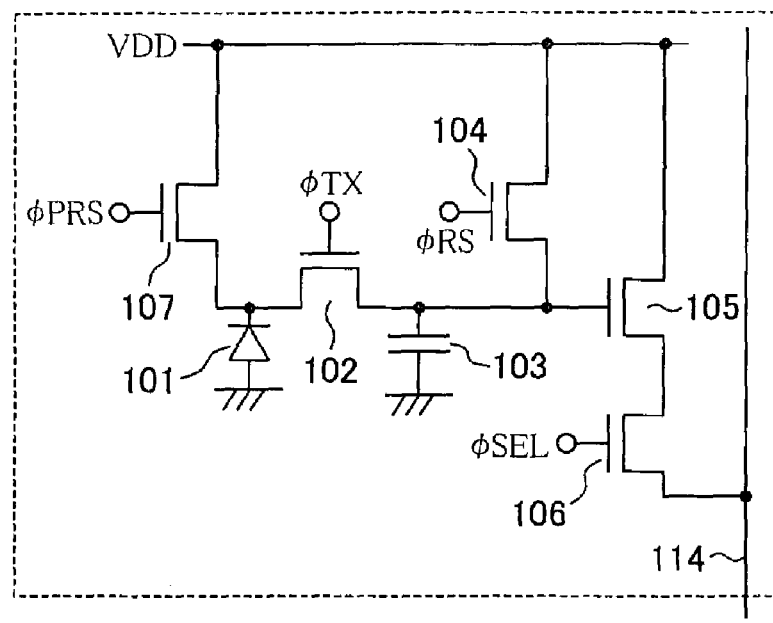
FIG. 19 shows a modification of the pixel construction of MOS imaging device in the first to fourth embodiments.

Further, while, in the above first to fourth embodiments, one having 4-Tr construction consisting of four transistors has been shown as a single pixel of the pixel section of MOS imaging device, it is also possible to use a pixel having construction where a discharge transistor 107 is further provided as shown in FIG. 19 to reset the electric charge of photodiode 101. In such case, exposure is started by turning ON and then OFF the discharge transistor 107 simultaneously for all pixels.

A fifth embodiment of the invention will now be described. A summary of the MOS imaging device of this embodiment is as follows. At first, two, or first and second photodiodes are disposed within one pixel at locations that are regarded as the same position at which image is formed by a taking optical system. At first, the first photodiodes of all pixels are concurrently resets and, after passage of a predetermined exposure time, the second photodiodes are concurrently reset. Subsequently, signals are read out substantially simultaneously row by row, and the signal of second photodiode is subtracted from the signal of first photodiode to obtain a difference signal corresponding to that of the reset time. The MOS imaging device is thereby achieved as having a global shutter function where exposure time of all pixels is uniformed with eliminating the problem of FPN due to dark current or KTC noise. In the fifth embodiment, the present invention is applied to the camera system using a MOS imaging device having the above described construction.

Figure 20:
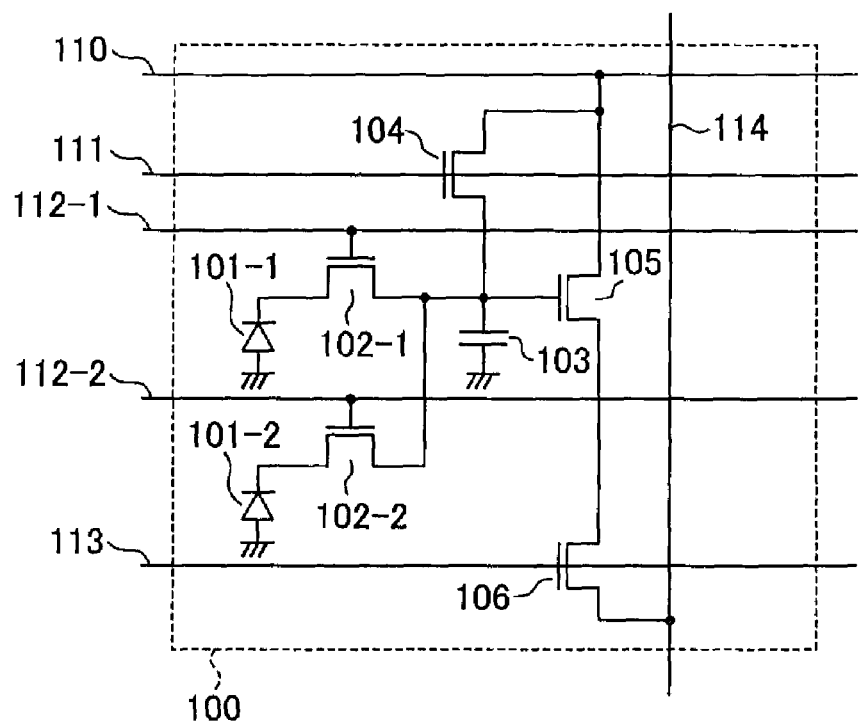
FIG. 20 shows the pixel construction of MOS imaging device in a fifth embodiment.

A pixel construction of the above described MOS imaging device will now be described by way of FIG. 20. Denoted by 100 in FIG. 20 is a single pixel. The single pixel 100 has construction where two photodiodes are provided in a unit pixel having the conventional 4-TR construction, and two transfer transistors are provided corresponding thereto. In particular, it includes: a first photodiode 101-1 and a second photodiode 101-2; a first and second transfer transistors 102-1, 102-2 for transferring signal charges generated at the first and second photodiodes 101-1, 101-2 respectively to a charge accumulation section 103; a reset transistor 104 for resetting the charge accumulation section 103, and first and second photodiodes 101-1, 101-2; an amplification transistor 105 for amplifying and reading voltage level of the charge accumulation section 103; and a select transistor 106 for selecting the pixel to transmit an output of the amplification transistor 105 to a vertical signal line 114. Here, the first and second photodiodes 101-1, 101-2 are provided as having the same size on the same one semiconductor substrate, and located at image forming positions that are optically regarded as the same. Those components but the first and second photodiodes 101-1, 101-2 are shielded from light.

Referring to FIG. 20, denoted by 110 is a pixel power supply which is electrically connected respectively to drain of the amplification transistor 105 and drain of the reset transistor 104. Denoted by 111 is a reset line for resetting pixels corresponding to one row, which is electrically connected to the gate of the reset transistor 104 of the pixels corresponding to one row. Denoted by 112-1, 112-2 are a first and second transfer lines for transferring signal charges of the first photodiode 101-1 and the second photodiode 101-2 of the pixels corresponding to one row to the charge accumulation section 103 of each pixel, which are electrically connected respectively to the gates of the first and second transfer transistors 102-1, 102-2 of the pixels corresponding to one row. Denoted by 113 is a select line for selecting the pixels corresponding to one row, which is electrically connected to the gate of select transistors 106 corresponding to one row.

In the fifth embodiment, similarly to the third embodiment shown in FIG. 13, a quick return mirror 4 is disposed as the incident light quantity changing means 12 for MOS imaging device having a pixel section where single pixels having the construction as described above are arrayed into m-rows by n-columns.

Figure 21:
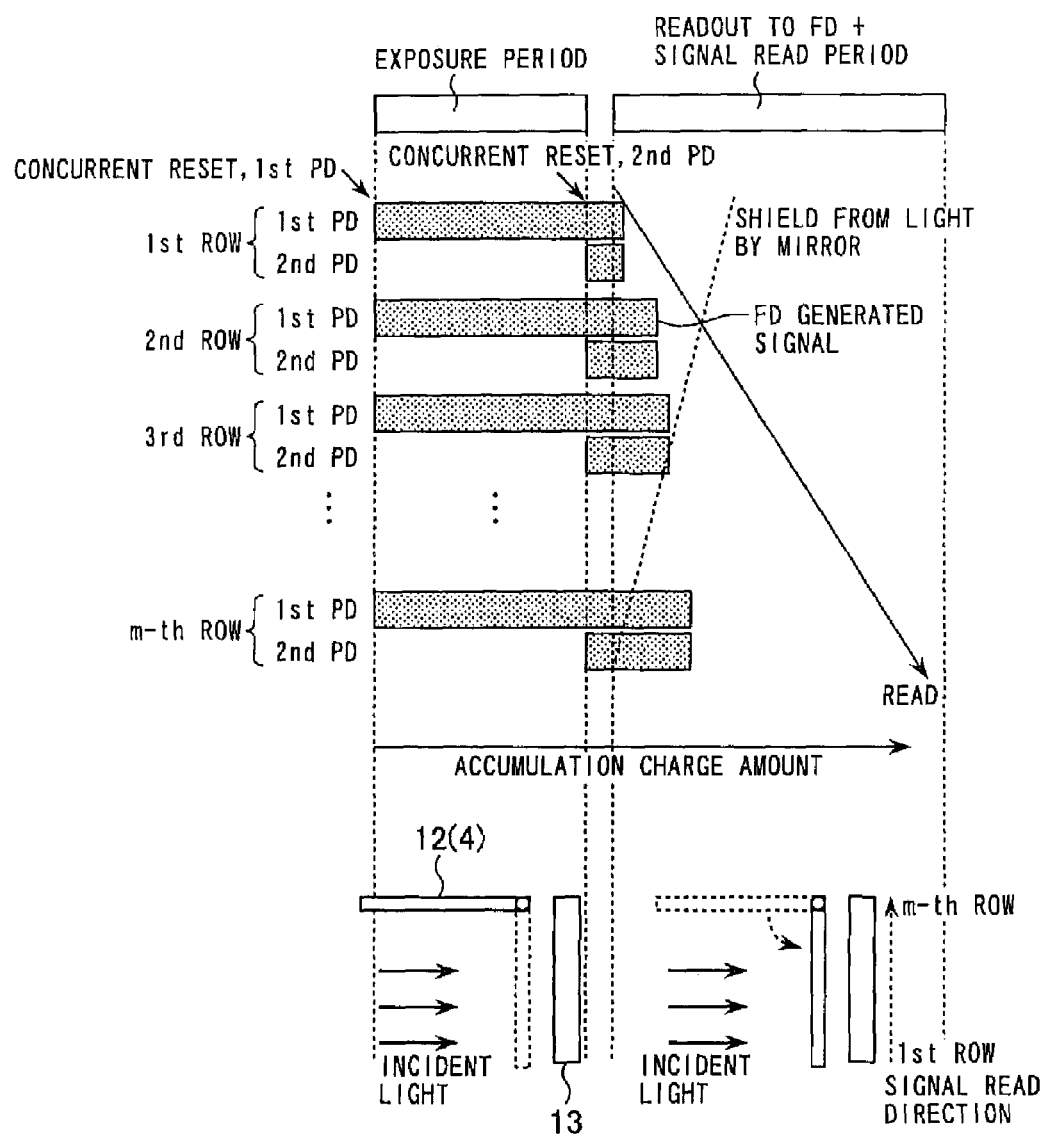
FIG. 21 shows accumulation charge amounts in an exposure period and period for transfer to and signal readout from the charge accumulation section of the pixels of each row of MOS imaging device, and operation modes of a quick return mirror serving as an incident light quantity changing means in the fifth embodiment.
Figure 22:
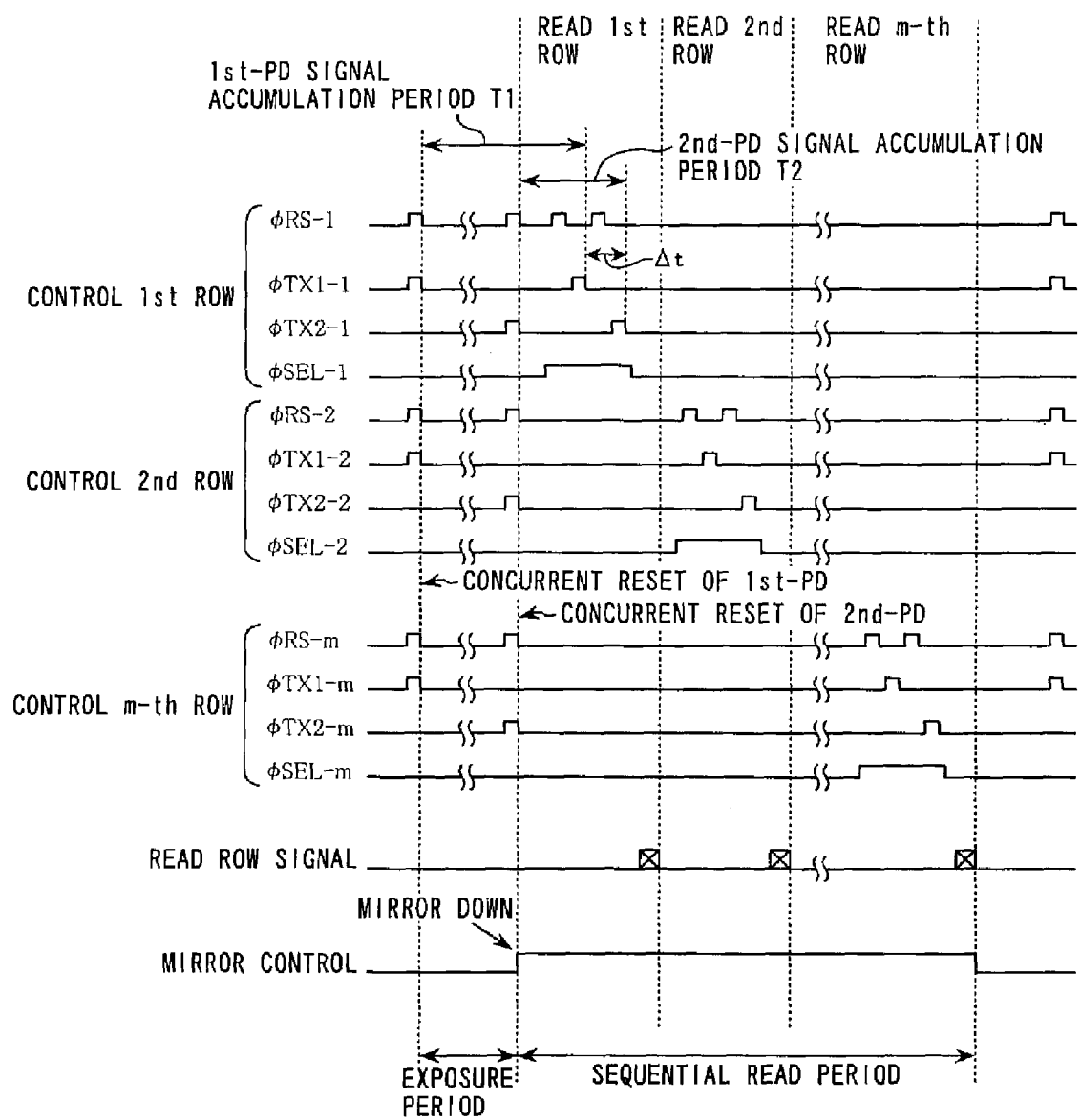
FIG. 22 is a timing chart for explaining operation of the pixel section of MOS imaging device and control operation of the quick return mirror in the fifth embodiment.

An operation in the fifth embodiment will now be described with reference to FIG. 21 showing charge accumulation amounts in the exposure period and period of sequential read of the pixels of each row and operation modes of the quick return mirror 4 serving as the incident light quantity changing means 12, and also to the timing chart shown in FIG. 22 for explaining operation of the pixel section and operation of the quick return mirror 4. First, row reset signals φRS1-1 to φRS1-$m$ and first row transfer signals φTX1-1 to φTX1-$m$ are inputted to all rows of the pixel section to concurrently reset the first photodiode 101-1 and charge accumulation section 102 of all pixels. Next at a point in time after passage of a predetermined time (exposure period), row reset signals φRS1-1 to φRS1-$m$ and second row transfer signals φTX2-1 to φTX2-$m$ are inputted to all rows to concurrently reset the second photodiode 101-2 and charge accumulation section 102 of all pixels.

During the above described exposure period, the quick return mirror 4 is kept to its lifted up position to effect normal image taking. At the point in time of concurrently resetting the second photodiode 101-2 and charge accumulation section (point of completion of exposure period), the quick return mirror 4 is brought down by control signal from the control apparatus. The light incident to the MOS imaging device is thereby shut off.

Next in the condition where the incident light is shut off, row select signal φSEL-1 of the first row is inputted, and then the first and second row transfer signals φTX1-1, φTX2-1 are respectively inputted to select and read the pixel signals of the first and second photodiodes 101-1, 101-2 of the pixels of the first row. A differential processing of the two signals is then effected and a difference signal thereof is outputted as the pixel signal of the first row. After that, pixel signals of the second row and after are sequentially outputted in a similar manner.

At this time, the period from the point of the concurrent resetting of the first photodiode 101-1 to the inputting of the next (second-time) first row transfer signal φTX1-1 of the first row becomes a signal accumulation period T1 of the first photodiode 101-1. Further, the period from the point of the concurrent resetting of the second photodiode 101-2 to the inputting of the next (second-time) second row transfer signal φTX2-1 of the first row becomes a signal accumulation period T2 of the second photodiode 101-2. The time difference Δt between the respective inputting of the second-time, first and second row transfer signals φTX1-1, φTX2-1 is very short as compared to the period (T1-T2). Accordingly, the difference signal between the first and second photodiodes 101-1, 101-2 becomes a signal that depends only on accumulation charge in the period of difference between the signal accumulation period T1 of the first photodiode 101-1 and the signal accumulation period T2 of the second photodiode 101-2, or in other words a predetermined period (exposure period) between the point of the concurrent resetting of the first photodiode 101-1 and the point of the concurrent resetting of the second photodiode 101-2.

Obtained thereby are the concurrent exposure signals where exposure time of all pixels can be uniformed. Accordingly, imaging signals are obtained without deteriorating S/N of the imaging signal output due to the effect of dark current or KTC noise.

Also in the MOS imaging device having this construction, however, saturation of signal charge of the first and second photodiodes may occur at the time of high-luminance image taking. There is then a problem that a spurious signal is outputted in the difference signal when one or the other is saturated, and, if both are saturated, the difference signal becomes substantially zero.

In the present embodiment, the quick return mirror 4 is brought down during the period of signal read so as to shut off the light incident the MOS imaging device. It is thereby possible to prevent the saturation of output signal of the first and second photodiodes so that an outputting of spurious signal in the difference signal thereof can be prevented.

Figure 23:
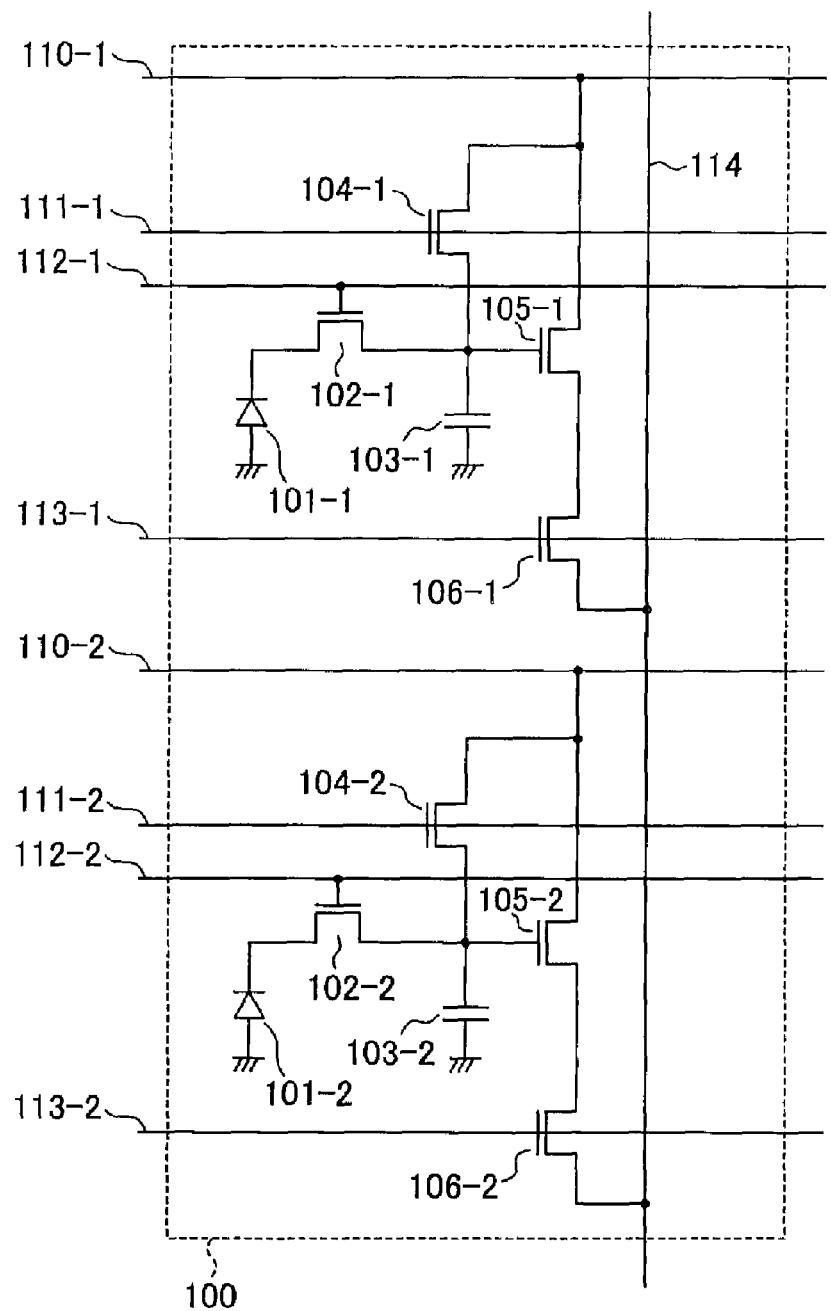
FIG. 23 shows a modification of the pixel construction of MOS imaging device in the fifth embodiment.

While the construction of a pixel section where pixels each having the two, or the first and second photodiodes within a single pixel are arrayed into m-rows by n-columns has been shown in the fifth embodiment, similar effect and advantages may be obtained also when the pixel section is constructed as in the following. In particular, as shown in FIG. 23, one having construction where two unit pixels having conventional 4-Tr construction are simply placed side by side into a combination is provided as a single pixel, and those of this construction are arrayed into m-rows by n-columns to constitute a pixel section. The photodiodes of the first and second unit pixels are then caused to operate respectively as the first and second photodiodes so that similar effect and advantages as the above fifth embodiment are obtained.

Further, while one using a quick return mirror as the incident light quantity changing means has been shown in the fifth embodiment, the stop mechanism shown in the first embodiment or the liquid crystal shutter shown in the fourth embodiment may be used as the incident light quantity changing means.

As has been described by way of the above embodiments, according to the first aspect of the invention, in a camera system using MOS solid-state imaging device where pixel signals are sequentially read out with determining an exposure time by simultaneously resetting the signals of photoelectric conversion section for all pixels and effecting transfer of signal to a charge accumulation section after a predetermined time, since the quantity of light incident to the MOS solid-state imaging device during operation of reading signal from each pixel of the MOS solid-state imaging device is suppressed, an excessive charge generated by leakage to the accumulation section or light leakage can be reduced to prevent deterioration of signal during the signal read operation.

According to the second aspect of the invention, in a camera system using MOS solid-state imaging device where a pixel section is composed of signal-to-be pixels for transferring signal generated at photoelectric conversion section to an accumulation section and correcting pixels not transferring to an accumulation section, and difference signal between the signal from the signal-to-be pixels and the signal from the correcting pixels is outputted as an image signal, the quantity of light incident to the MOS solid-state imaging device during operation of reading signal from each pixel of the MOS solid-state imaging device is suppressed. Thereby the charge generated by leakage to the accumulation section or light leakage can be reduced to eliminate deterioration of signal and also to suppress an occurrence of spurious signal resulting from saturation at the accumulation section of the signal from the signal-to-be pixels. Here, since a main object in the camera system according to this aspect is to suppress an occurrence of spurious signal, the measures to prevent light leakage to the accumulation section does not have to be perfect.

According to the third aspect of the invention, in a camera system using MOS solid-state imaging device having a pixel section consisting of pixels each having a first and second photoelectric conversion sections where the first photoelectric conversion sections are simultaneously reset for all pixels and, after a predetermined exposure time, the second photoelectric conversion sections are concurrently reset so that sequential read operation is subsequently effected to output the difference signal between the two as imaging signal, the quantity of light incident to the MOS solid-state imaging device during operation of reading signal from the MOS solid-state imaging device is suppressed. Thereby the charge generated by light leakage to the accumulation section can be reduced in a similar manner to suppress signal deterioration during the signal read operation so as to prevent an occurrence of spurious signal. Here, since a main object in the camera system according to this aspect is to suppress an occurrence of spurious signal, the measures to prevent light leakage to the accumulation section does not have to be perfect.

According to the fourth and fifth aspects of the invention, a mechanism naturally provided in a camera system is used to readily form the incident light quantity suppressing means. According to the sixth aspect of the invention, the incident light quantity suppressing means can be formed of a stable static member without having a mechanical displacement structure. According to the seventh aspect of the invention, while those rows or columns that are read out late are most vulnerable and have a greater amount of excessive charge due to leak or leakage light, the deterioration of signal or occurrence of spurious signal may be effectively prevented by suppressing the quantity of incident light in sequence starting from those rows or columns to be late.

What is claimed is:

1. A camera system comprising:
a MOS imaging device comprising a pixel section having a plurality of pixels two-dimensionally arrayed in row and column directions, each having a photoelectric conversion section for generating electrical signal corresponding to a quantity of incident light, an accumulation section for accumulating signal generated at the photoelectric conversion section, a transfer switch means for controlling transfer of signal from said photoelectric conversion section to said accumulation section, a reset switch means for resetting signal of said photoelectric conversion section, an amplification section for outputting a voltage value corresponding to signal of said accumulation section, and a select switch for selecting output of the amplification section, wherein an exposure period is determined by simultaneously resetting signals of said photoelectric conversion section for all pixels and effecting signal transfer from said photoelectric conversion section to said accumulation section after a predetermined time, and readout of signal from said pixels is sequentially effected at later time;

an incident light quantity suppressing means for suppressing the quantity of light incident to said MOS imaging device in a period during which each row of the MOS imaging device is read out sequentially, wherein said light incident to the MOS imaging device is suppressed by limiting an aperture of a stop mechanism of the incident light quantity suppressing means by narrowing said stop mechanism as an excessive charge increases in the signals of the pixels of the rows due to the rows read out later in the sequential order retain the signals in the accumulation section longer relative to the rows read out earlier in the sequential order, and wherein the incident light quantity suppressing means initiates operation in response to completion of exposure of the MOS imaging device; and a control means for controlling the operation of the incident light quantity suppressing means so that the incident light quantity to the imaging device is only suppressed and not shielded completely.

2. The camera system according to claim 1, wherein said incident light quantity suppressing means suppresses the quantity of light incident to said MOS imaging device by a mechanical structure.

3. The camera system according to claim 1, wherein said incident light quantity suppressing means suppresses the quantity of light incident to said MOS imaging device by an electrical control of a member for changing transmittance of light.

4. The camera system according to claim 1, wherein said incident light quantity suppressing means suppresses the quantity of light incident to said MOS imaging device in sequence starting from rows or columns of which signals are readout late in the MOS imaging device.

* * * * *